Figure 1:
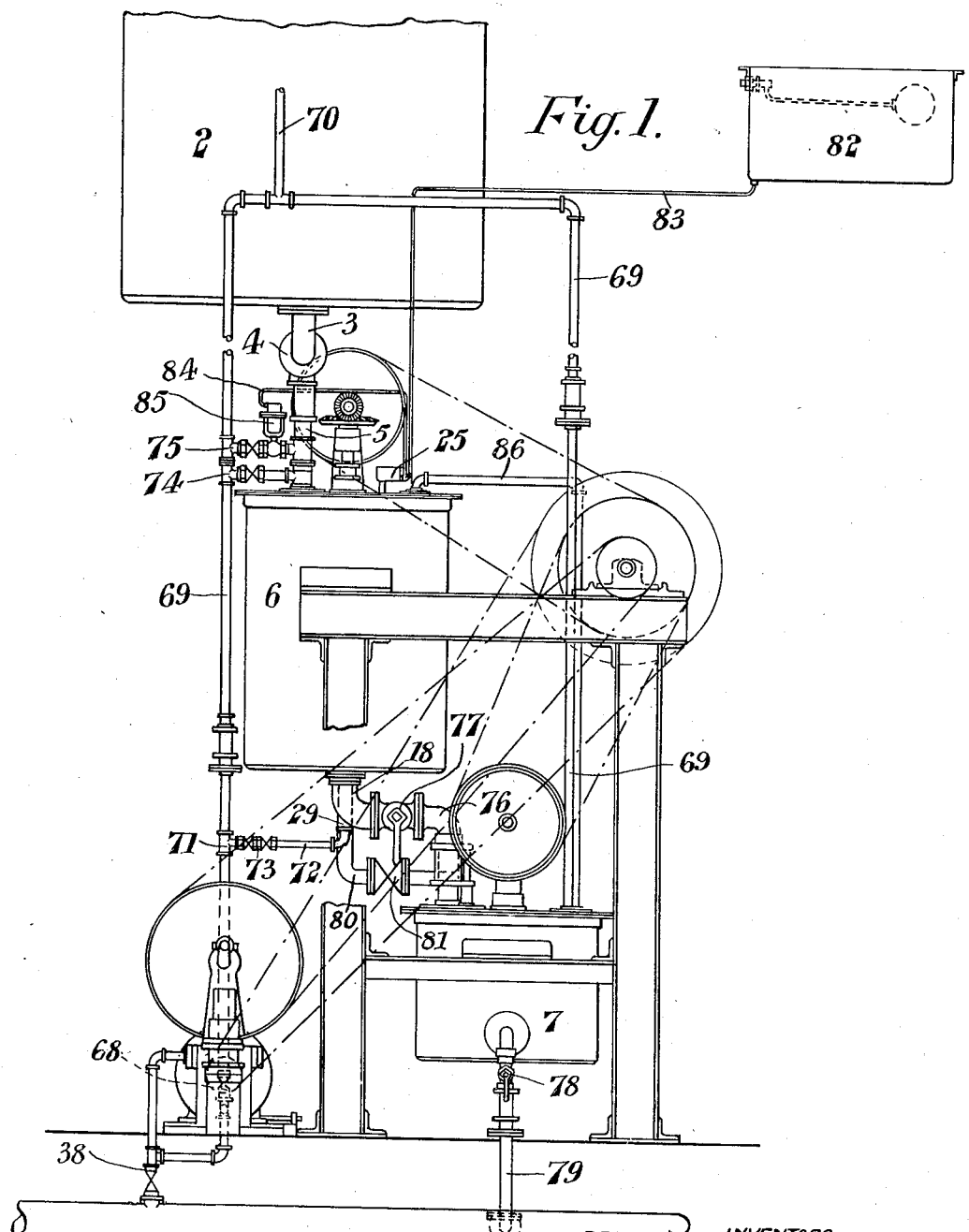

May 14, 1929. E. A. ALLIOTT ET AL 1,713,317
FILTRATION
Filed Feb. 19, 1927 6 Sheets-Sheet 1

INVENTORS
EUSTACE ALEXANDER ALLIOTT
and ARTHUR EDWARD HATFIELD
BY THEIR ATTORNEYS
Howson and Howson

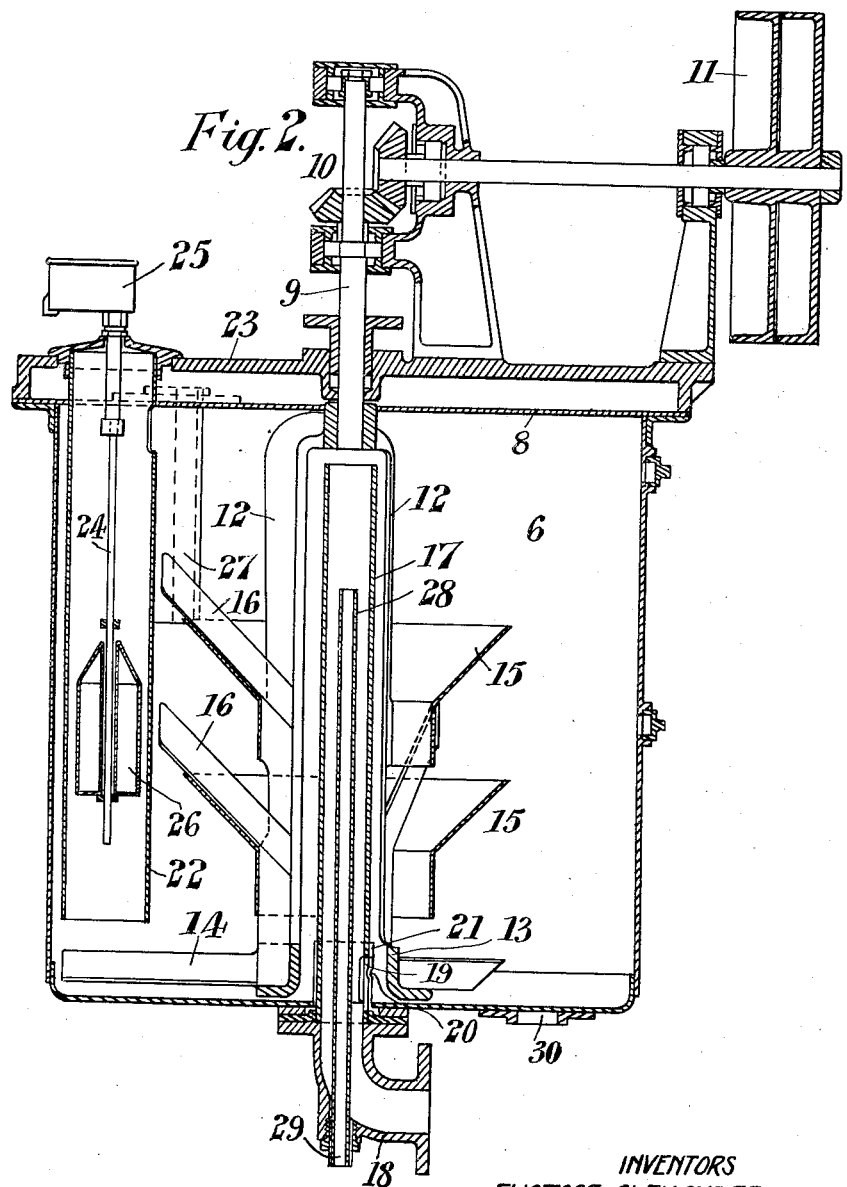

May 14, 1929.  E. A. ALLIOTT ET AL  1,713,317
FILTRATION
Filed Feb. 19, 1927  6 Sheets-Sheet 3
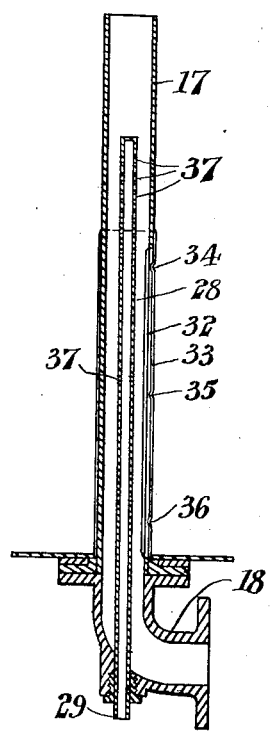
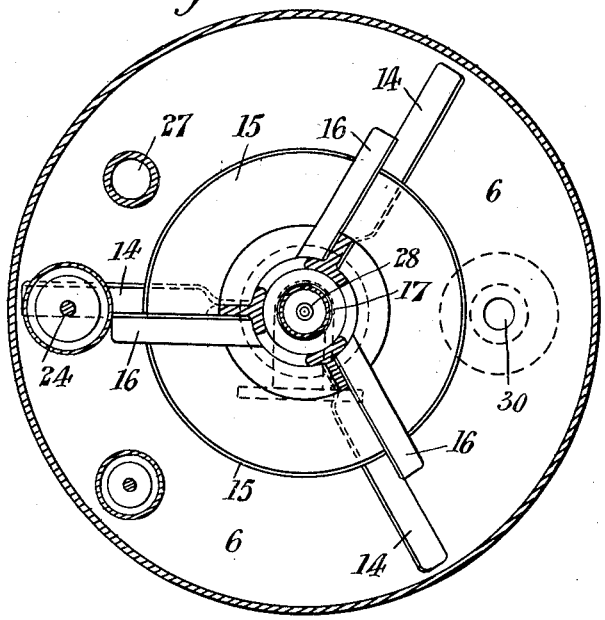
INVENTORS
EUSTACE ALEXANDER ALLIOTT
and ARTHUR EDWARD HATFIELD
BY THEIR ATTORNEYS
Howson and Howson

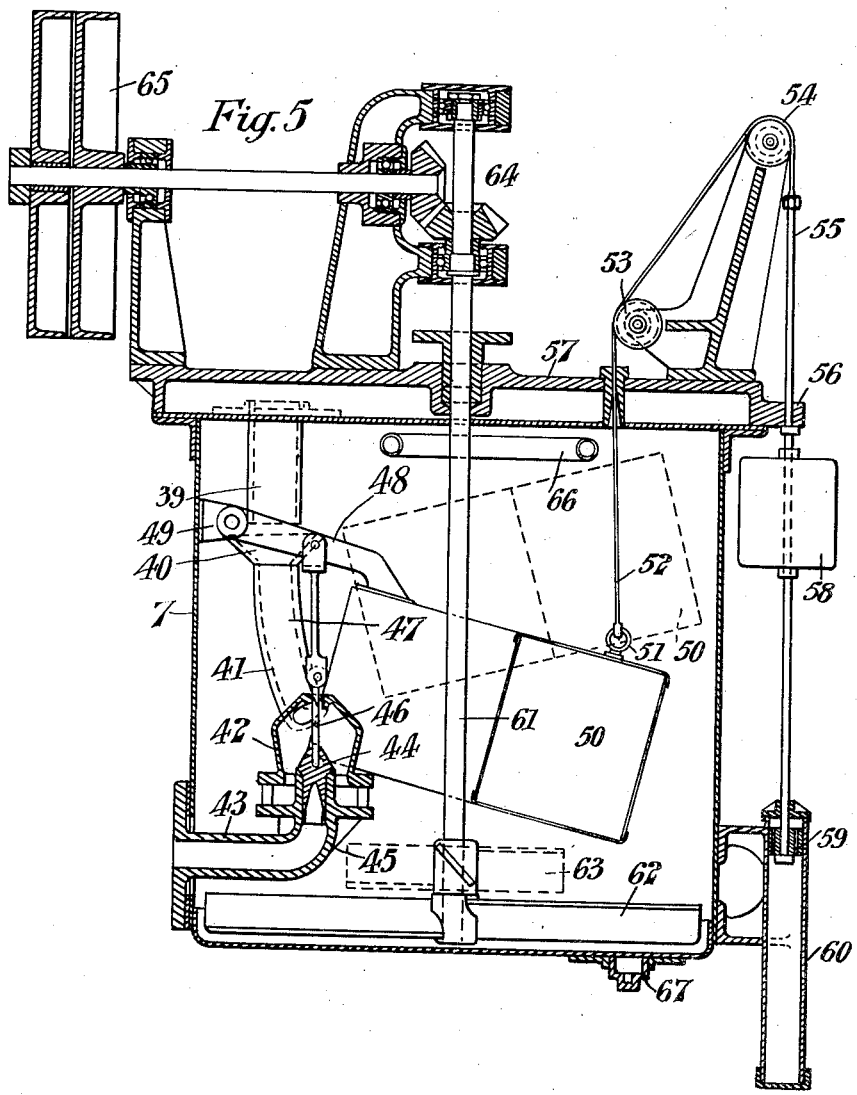

INVENTORS
EUSTACE ALEXANDER ALLIOTT
and ARTHUR EDWARD HATFIELD
BY THEIR ATTORNEYS Howson and Howson

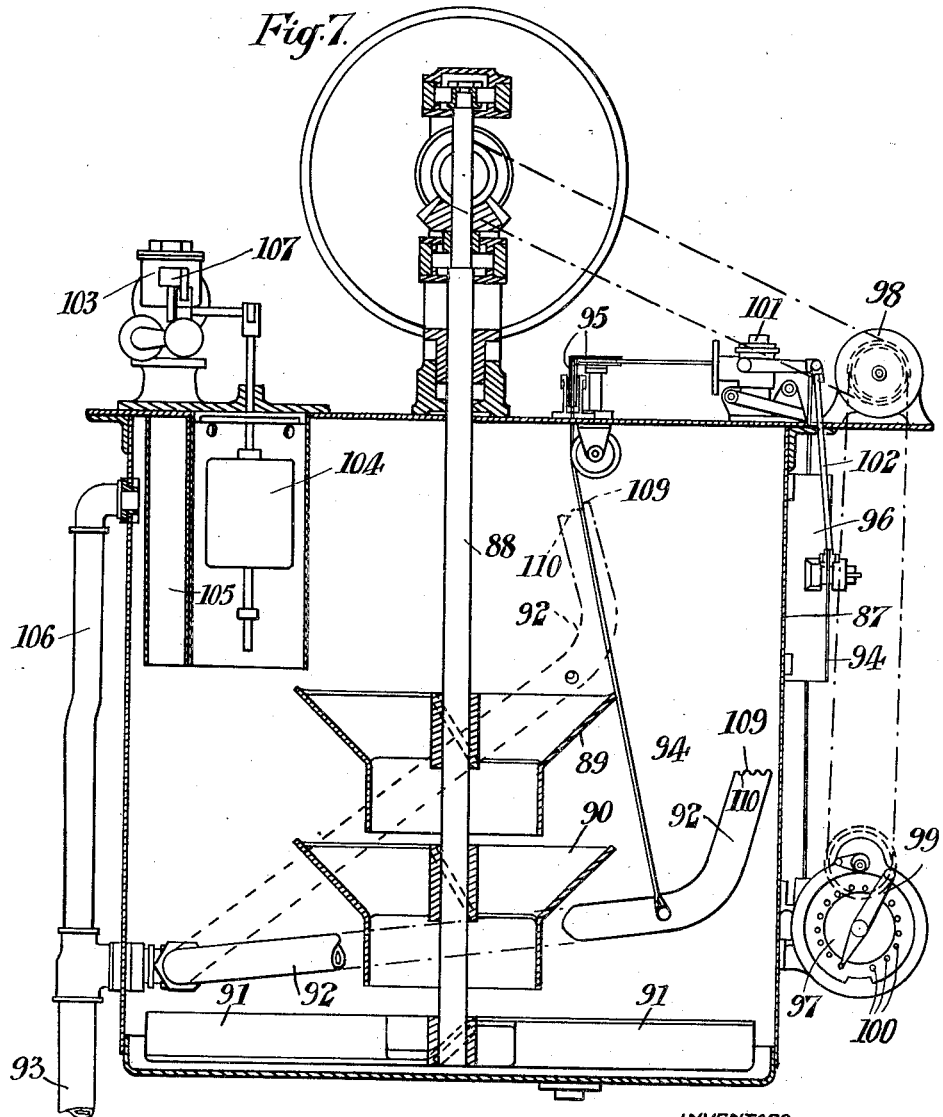

Patented May 14, 1929.

1,713,317

UNITED STATES PATENT OFFICE.

EUSTACE ALEXANDER ALLIOTT, OF GREENBANK, CHESHAM BOIS, AND ARTHUR EDWARD HATFIELD, OF LEYTONSTONE, LONDON, ENGLAND.

FILTRATION.

Application filed February 19, 1927, Serial No. 169,544, and in Great Britain March 20, 1926.

This invention relates to improvements in filtration and more particularly to processes and apparatus for cleaning the soiled liquid obtained from the washing machine used in dry cleaning, laundry washing, wool scouring and other like operations producing a soiled liquid which is, or can be, cleaned by treating it with filter aids and passing it to a filter.

By filter aids in the following description and in the claims, we mean finely divided porous absorbent materials or reagents which improve the filtering qualities of the soiled liquid when mixed with it. The following description refers to process and apparatus particularly suited to handling a suspension of finely divided porous cellular silica which is found to be a useful filter aid.

In Patent No. 1,704,604 granted March 5, 1929 to Arthur Edward Hatfield there is described a process of the kind referred to for clarifying and dehydrating the soiled solution obtained from the washing machines used in dry cleaning and the present invention has for its principal object to provide means for controlling the rate at which the filter aid, more particularly the finely divided porous absorbent materials, are added to the soiled liquid, in the said process, although it will be understood that the invention is not limited to the use of any particular filter aid and that it is applicable to operations other than dry cleaning. The reason for controlling the rate at which the filter aids are added is because, if the solution is continually circulated through the washing machine to the filter press and then back again to the washing machine while the operation is in progress, most of the dirt and other impurities are removed quite early in the process of washing any individual charge of dirty goods and filtering the resultant dirty liquid and during the remainder of the process the amount of solids to be removed falls off very noticeably. Should a constant supply of filter aid be added which is too low in the process at any point, the impurities in the solution are apt to form a very fine skin or membrane over the surface of the filter-press and filtration is seriously hindered, it being necessary to open and clean the press at what might be a very inconvenient stage during the process. If sufficient filter aid is used to ensure that there is no possibility of such an occurrence a proper proportion at one stage is found to be excessive for a large portion of the washing and filtering operation and the process is apt to become expensive and cumbersome. In some cases other troubles such as slipping of the deposit in the press may occur if the proportion of filter aid to impurities is too great.

One possible method of avoiding the difficulty is to provide clean liquor sufficient to carry through the whole of the major portion of the operation and to pour the dirty solution out in a tank sufficient to contain the whole or the greater part of the dirty solution from a single washing. The correct proportion of filter aid is then placed in the tank. Such a process, however, involves the use of large tanks and is not convenient in operation.

According to this invention we treat the soiled liquid with filter aids and then pass the liquid to a filter in such manner that the percentage of filter aid in the liquid passing to the filter is automatically varied as the process proceeds. By a filter we mean a filter press, centrifugal or other separating means. It will be understood that the cycle of variation is repeated for each operation.

In order that the invention may be fully understood we will describe various methods of carrying it out in practice more particularly as applied to dry cleaning processes.

Figure 8:
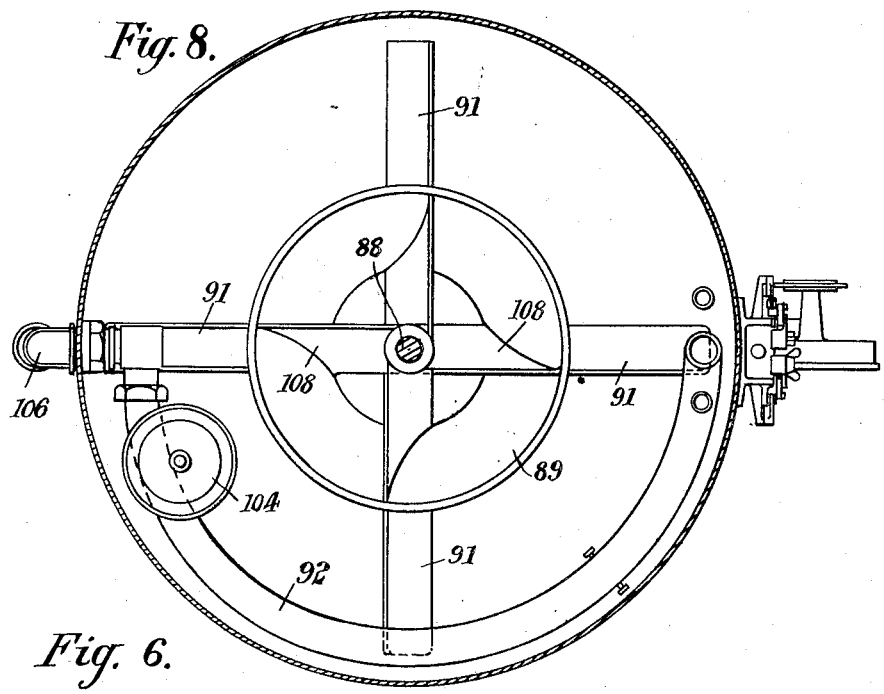
Figure 6:
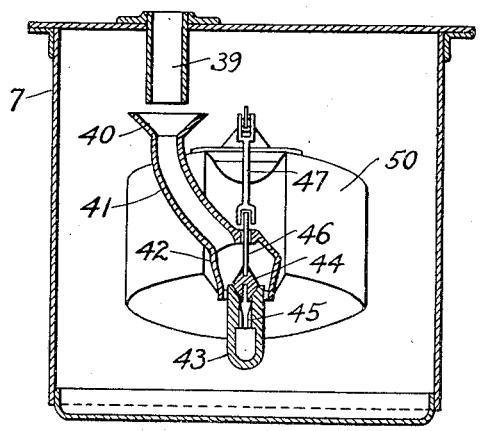

Referring to the accompanying drawings, Figure 1 shews an assembled view of an apparatus for carrying out the process in accordance with the invention, Figure 2 shews a vertical section through a part of the apparatus, Figure 3 being a horizontal section of Figure 2, Figure 4 shews an alternative arrangement that may be used in place of the outlet means shewn in Figure 2, Figure 5 shews a vertical section through another part of the apparatus, Figure 6 shews another view of some of the parts shewn in Figure 5, Figure 7 shews a vertical section of an alternative arrangement to that shewn in Figure 2, and Figure 8 is a horizontal section of Figure 7.

Referring to Figure 1, part of the pipe line in which the soiled liquid flows from the washing machine to the filter press is indicated at 1, the liquid flowing in the direction indicated by the arrow. At the top of the apparatus is a tank 2 in which is placed a quantity of clean solvent of the kind used in the washing machine and a comparatively large quantity of filter aid is then introduced into the tank so as to produce a concentrated suspension or solution of filter aid, which may be agitated by means of stirrers within the tank. The filter aid solution flows from the tank 2 through a pipe 3, stop cock 4, and pipe 5 into the regulating chamber 6 which is shewn in detail in Figures 2 and 3. The solution passing out from the chamber 6 flows through pipes 18 and 76 and feed valve 77 into a float chamber 7 which is shewn in detail in Figures 5 and 6. From the float chamber 7 the solution flows into the main pipe line 1 through the stop cock 78 and pipe 79. A portion of the soiled liquid obtained from the washing machine is withdrawn through the pipe 38 and this portion is used for flushing and other purposes and constitutes the flushing liquid referred to in the different parts of the following description. Clean or filtered liquid may be used instead of soiled, this being merely a matter of convenience. All such flushing liquid must be substantially free from filter aid. The other parts shewn in Figure 1 and the operation of the whole apparatus will be more fully described hereinafter.

The object of the float chamber is to free the outlet from the tank 6 from any suction in the pipe line 1, particularly if the washer is subjected to vacuum, thus preventing the flow from varying with variation in suction or vacuum. It also prevents air entering the line 1. If the washer is not under vacuum the float chamber may be omitted if desired.

Referring now to Figures 2 and 3 the regulating chamber 6 comprises a reasonably vapour tight tank having a cover 8 through the centre of which passes a spindle 9 which is rotated through gearing indicated generally at 10 from the pulleys 11. To the lower end of the spindle is attached stirring apparatus which is suspended from the spindle by means of three arms 12. To the lower ends 13 of the arms are attached three agitator arms 14 which are fixed at an angle so that as they rotate they tend to lift the solution or suspension. Above the agitator arms 14 two funnels 15 are attached to the arms 12 though any efficient agitating arms or gear may be substituted for these. Three vanes 16 are fixed in each of the funnels. As the funnels rotate the solution within the funnels is caused to move upwardly and outwardly due to centrifugal action. With the stirrer described the liquid is thoroughly agitated and no filter aid is allowed to settle.

Within the stirrer and attached to the bottom of the chamber 6 is a tube 17 through which the filter aid solution passes out to the pipe 18. At the bottom of the tube is a slot 19 which registers with an outlet hole 20 in a thin sleeve 21, the purpose of which is to reduce the possibility of the filter aid choking up the outlet hole which it might do if the hole were made directly in the thicker tube 17. The agitator blades may be extended inwardly so as to sweep very closely past this hole.

A vertical tube 22 is fixed to the top cover 23 of the chamber 6 and within the tube is a rod 24 the top end of which is connected to a relay indicated at 25, a float 26 being connected to bottom of the rod 24. The tube 22 prevents the float from being affected by the whirling motion of the body of the solution within the chamber 6. The relay 25 may be of any known kind and is designed to allow of the entry into the chamber 6 of a flow of flushing solution when the float 26 has fallen to a predetermined level. The preferred form of relay 25 controls a flow of water under pressure which in turn opens or closes a stop cock in the pipe line through which the flushing solution passes. Relays which will act in this manner are well known and are not shewn in the drawings. The flushing solution enters the chamber 6 through the pipe 27. A tube 28 is preferably arranged within the tube 17 as shewn and the lower end 29 is connected to a pump which forces flushing solution in the tube 28 at a rate sufficient to prevent any filter aid clogging up tube 17 after passing into it through outlet 20, or when it is desired to flush out the lower portion of the tube 17. A draining connection 30 which is normally closed is placed in the bottom of the chamber 6 as shewn.

In operation, the stirrers are set in motion and the chamber 6 is filled with concentrated filter aid suspension or solution through the inlet 27 which connects with the tank 2 shewn in Figure 1. Inlet 27 connects to pipe 5 and admits either a filter aid supply from 2 or flushing liquid from 74 or 75. The chamber 6 is filled until the level is about as high as the top of the tube 17 when the supply is cut off either by hand or automatically. The filter aid flows out of the chamber 6 by passing through the hole 20 into the pipe 18. When the level has descended to a point where the chamber is about one half full the float 26 operates the relay indicated at 25 to admit a flow of flushing liquid into the chamber through the pipe 27. The flushing liquid, which is free from filter aid, and may, as hereinbefore described, consist of a portion of the soiled liquid obtained from the washing machine, as soon as it enters the chamber 6 is intimately mixed with the filter aid so that the proportion of filter aid in the solution passing through the pipe 18 remains constant until the chamber 6 has half emptied after which it is rapidly reduced, the liquid flowing through the pipe 18 remaining constant in strength, but diminishing somewhat in rate of outflow until the float 26 brings in the flushing liquid. It then remains constant in rate of outflow but the strength of filter aid in the liquid diminishes in a peculiarly suitable manner, since the laws controlling the washing out of the filter aid are closely analogous to those governing the removal of the dirt from the washer. The arrangement permits advantage to be taken of this, while providing space for the next charge of filter aid by running out a proportion by direct outflow at the commencement of the operation. The quantity of flushing solution entering the chamber 6 is regulated by the float controlled relay 25 to maintain the level in the chamber substantially constant.

Figure 4 shews a less costly alternative outlet arrangement which may be used in place of that shewn in Figure 2. With this arrangement in the chamber 6, the float operated relay 25 and its associated parts are dispensed with. Referring to Figure 4, the tube 17 is provided with a vertical slot 32 which is covered by a thin sleeve 35 on the tube. A convenient number of holes for instance three, are provided in the sleeve which is placed in such a position that the said holes register with the slot 32. The sleeve 33 fulfils the same function as the sleeve 21 in Figure 2, that is to say, it provides a thin edge which reduces the possibility of choking. The tube 28 is provided with a number of holes 37 which cause the flushing solution to fall in the tube 17 in the form of a fine spray which is directed against the inner wall of the tube 17. In operation the chamber 6 is filled with filter aid solution as before and the supply is then cut off. As the chamber empties the solution at first flows into the tube 17 through the three holes 34, 35 and 36. When the level of the hole 34 has been reached the solution only continues to flow through the holes 35 and 36 and finally the flow is through the hole 36 only. The percentage of filter aid in the solution flowing through the pipe 18 remains substantially the same throughout, but the rate of flow of the solution decreases. The agitator may advantageously be set to brush the holes as closely as possible. The arrangement may be used with only one hole near the bottom of the tube 17 the rate of flow then being entirely dependent on the head in the tank. The design is intended to eliminate any suction or pressure inside the pipe 17.

The filter aid solution passing out of the regulating chamber 6 flows into the float chamber 7 which is shewn in detail in Figures 5 and 6. The solution enters through a pipe 39 and passes into a funnel 40 fixed at the top of a pipe 41 the lower end of which passes into a bell shaped cover 42, which in turn is fixed to the outlet pipe 43. The passage from the cover 42 to the outlet pipe 43 is controlled by a valve 44 which is provided with V-shaped slots 45 (see Figure 6) to steady its action. The valve is connected to the lower end of a rod 46 the upper end of which is pivoted to a link 47 which depends from a float arm 48. This arm is pivoted at one end to a bracket 49 riveted to the chamber 7 and at its other end it is fixed to a float 50. To the top of the float is attached a ring 51 to which is fastened a rope or wire 52 which passes over pulleys 53 and 54 and is then connected to a rod 55. The rod 55 slides within and is guided by a hole 56 in the upper cover 57 of the chamber. The rod 55 supports a balance weight 58 and is provided at its lower end with a piston 59 adapted to move within the oil dash pot 60.

A shaft 61 passes through the centre of the chamber 7 and carries agitator arms 62 and 63 adapted to give a lifting action when stirred. The top of the rod 61 is connected with gearing indicated generally at 64 driven through the pulleys 65. A circular spray pipe 66 is provided in the position shewn through which a spray of flushing liquid may be introduced when desired. A draining plug 67 is provided in the bottom of the chamber 7.

In operation, the float chamber is maintained filled with filter aid solution at a level which will keep the float in a position intermediate of the two positions shewn in Figure 5. The oil dash pot 60 prevents any fluctuations of level due to the fact that the float chamber is relatively small considering the rate of flow of solution through it. The filter aid solution passes normally through the pipe 39 into the pipe 41 and thence into the cover 42 direct into the outlet pipe 43. The liquid in the cover 42 is in direct contact with the main body of liquid in the chamber 7 through the bottom of the cover 42, as shewn more clearly in Figure 6. This ensures that the pipe 43 will always be flooded with solution, even when a reduced supply, or no supply at all enters the pipe 39. An inlet (not shewn in Figures 5 and 6) is also provided in the cover 57 through which flushing liquid free from filter aid is passed to keep up the level within the chamber 7. As the valve 44 is always flooded, there is no necessity for it to be an air-tight fit, and the continual supply of flushing liquid tends to prevent filter aid settling in the valve and pipe 43 and choking them.

It will be seen that with the arrangement shewn in Figures 5 and 6, the solution in the pipe 43 may be under a heavy suction, which is particularly the case if the washer is working under vacuum. The function of the float chamber is to render the flow of filter aid from the tank 2, independent of the suction in main pipe line 1, and to prevent air leaking into the system. In some cases, when the washer is not subjected to vacuum, the float chamber may be dispensed with and the chamber 6 connected directly to pipe 1 by means of an extension of pipe 18. The pipe 43 is connected direct to the main pipe line 1 containing the soiled solvent.

Referring to Figure 1 again, the general arrangement shewn can now be more fully described. A small portion of the soiled solvent is withdrawn through pipe 38 and is forced by the pump, indicated generally at 68, up the pipe line 69 which passes up to the top of the apparatus and then down, ending at the float chamber 7. A strainer (not shown) is provided in the inlet to the pump, or in pipe 69 close to the pump, to stop small pieces of wool, fluff, and the like. The pump is also provided with a spring relief valve and return pipe. A vent-pipe 70 is provided to prevent any siphon action. Various branch pipes are taken off the pipe line 69 and convey the solution necessary for flushing purposes. At 71 a branch pipe 72 is connected through the flow regulator and stop cock 73, to the lower end 29 of the flushing tube 28 shewn in Figure 2. At 74 and 75 connections are made for flushing the pipe line 5, that at 74 being for occasional hand operation. The overflow of solution reaching the top of the pipe line 69 passes down direct into the float chamber 7. It will be seen that all the solution withdrawn through the pipe 38 returns eventually to the main pipe line 1 through the pipes 43 and 79 and that the branch pipes for flushing purposes are kept under constant heads dependent on the height of pipe 69.

The draining connection 30 (shown in Figure 2) is connected through the pipe 80 containing the stop cock 81 with the float chamber 7. The stop cock 81 is normally maintained closed, but the arrangement provides a means for emptying chamber 6 rapidly.

The hydraulic relay 25, (see also Figure 2) is connected with a water tank 82 through the pipe 83. The relay controls a flow of water in the pipe 84 to open or close a hydraulically operated stop cock 85 in the branch connection 75. A pipe 86 connects the chambers 6 and 7 and maintains an equilibrium of pressure in the said chambers enabling liquid to flow from one to the other without loss of vapour laden air. The motor or driving means operating the pump 68 also drives the gearing rotating the agitators in the two chambers 6 and 7. This is clearly shewn in Figure 1. If desired the pipe 38 may be connected to the main through which the filtered solution leaving the filter press flows back to the washing machine, so that the flushing solution will not contain any of the dirt and grease removed from the articles being cleaned.

Figures 7 and 8 shew an alternative form of regulating chamber 87 which may be used instead of the chamber 6. Stirring gear comprising a central spindle 88, circulating funnels 89 and 90, having vanes 108, and agitator arms 91 are provided as before. A pipe 92 open at the upper end is swivelled to an outlet pipe 93 which passes to the float chamber. The pipe 92 is made semi-circular in shape as shewn in plan to avoid coming in contact with the stirring gear. A wire 94 supports the pipe 92 and passes over the pulleys 95 through the trip gear 96 and is wound at its other end on a drum forming part of the release mechanism 97. The release mechanism may be of any known kind which will release the rope 94 at a steady predetermined rate. Some of the mechanisms used for lowering the lamp in blue printing machines are very suitable. The release mechanism indicated consists of a drum, operated through a free wheel from a reduction gearing 98 which may be of any known kind; it is preferable to arrange so that this may be driven at several alternative speeds from the main driving shaft of the apparatus. A handle 99 is attached to the drum and enables the pipe 92 to be wound up or raised to an extent indicated by the position of the handle. A stop is placed in one of the holes 100 to hold back the handle 99 until it is desired to start releasing the rope or wire 94. The pipe 92 is shewn in full lines in its lowermost position and in dotted lines in its uppermost position. Handle 99 raises the pipe through the free wheel against the motion of the slow speed device and the free wheel acts in such a direction that the weight of the pipe can only cause the drum to unwind at the rate set by the speed reduction gear.

The mechanism 96 is arranged to trip open a valve 101 when the pipe 92 has been lowered to its final position which may be as shewn in the full lines. The mechanism 96 may comprise any known trip gear which can be operated by a block attached to the rope 94. The trip gear shewn is adapted to operate the valve 101 by means of the rod 102. The valve 101 is connected with a supply of flushing solution and is shut off by hand at the beginning or end of the operation and opened by trip gear at a predetermined moment at which the pipe comes to the lower end of its travel. The filter aid suspension or solution enters at 103 passing through a valve 107 which is controlled by a float 104. The valve 107 is constructed in known manner so that it can be operated by hand but is closed automatically by the float 104 when the chamber 87 is full. The solution flows into the chamber 87 through the pipe 105. An overflow pipe 106 connects with the outlet pipe 93. Chamber 87 may be fitted with a drain as shewn at 30, Figure 2, as previously described.

In operation the release mechanism 97 is made to wind up the rope 94 to lift the pipe 92 to the top position shewn by the dotted lines and the stirring apparatus is set in motion. The inlet valve 107 is opened to let in a supply of filter aid solution, the valve being automatically closed when the chamber 87 is full. The valve then remains closed and can only be opened by hand. The release mechanism is then started in operation to lower the pipe 92 at a predetemined speed. The solution in the chamber then flows into the pipe 92 through the open ended top thereof, which may be provided with a number of projections 109 and hollows 110 to assist the flow. The rate of flow in the pipe 92 is controlled by the speed at which the pipe 92 is lowered. The solution flows from the pipe 92 into the pipe 93 and away to the float chamber.

When the pipe 92 reaches its set lowest position, the release mechanism 97 comes against a stop and prevents further motion, and at the same time the valve 101 is tripped open by the mechanism 96 to let a supply of flushing liquid enter the chamber 87. The flow from valve 101 is controlled by another valve (not shewn) previously regulated so that the flushing solution will flow in at the same rate as the filter aid solution or suspension was previously flowing out of the pipe 92. The flow of liquid through the pipe 92 will therefore remain substantially constant all the time. The flushing liquid as it enters is immediately mixed, by the stirrers, with the liquid already in the chamber 87 so that although the flow of liquid in the pipe 92 will remain substantially constant throughout, the quantity of filter aid passing therethrough will be constant while the pipe 92 is being lowered after which the said quantity will rapidly diminish. In order to adapt the apparatus to varying conditions, stops may be provided whereby the travel of pipe 92 is limited in either an upward or downward direction, or in both, and the block 96 may have adjustment so that the trip mechanism may be set to correspond.

An additional automatic valve may be provided to admit additional filter aid to meet cases where the liquid in pipe 1 carries more than a usual proportion of dirt and emulsions. Such a valve may be opened by hand at the beginning of the operation, and closed, for instance, by additional adjustable trip mechanism carried by block 96, or controlled by any other convenient means.

The special convenience of the form of chamber shewn in Figure 7 is that an approximately constant rate of addition of filter aid is obtained during part of the operation and a varying rate at a later stage with the use of comparatively large openings through which the flow of liquid (as distinct from filter aid) is always quite appreciable, thus reducing any tendency of the filter aid to silt up the outlets. In this arrangement an initial approximately constant heavy flux is obtained, well suited to the manner in which the dirt and the like is first disengaged from the goods in the washer and a final decreasing flux of a type specially suited to the manner in which the last traces of dirt and emulsions come away from the goods in the washer. Space is, moreover, provided for a supply of filter aid to be run in at the commencement of a subsequent operation, without it being first necessary to run further liquor out to make room for it.

It is also clear that the pipe 92 may be adapted to give a varying outflow if desired at any stage by suitably shaping the drum on which the wire 94 is wound.

Since the pipes whereby chamber 6 is supplied with filter aid from the main storage tank 2 are liable to be choked by settlement of certain types of filter aid usually employed it is preferable to cause a constant flow of liquid to circulate by means of a pump through these pipes which are led back again to vessel 2 to form a complete circuit. The inlet 5 (Figure 1) to vessel 6 is then a branch pipe from the closed circuit, preferably led upwards from it, and kept as short as possible.

In addition to the methods described above for carrying out the invention it is obvious that many others may be employed to achieve the same end.

For instance, a tank of capacity comparable with and preferably greater than that of the liquid contents of the washer may be fitted with agitating gear and inserted in pipe 1 so that the dirty liquid passes through it in its passage from the wash to the filter. Filter aid may be run into the tank the whole proportion being added at the commencement of the operation, or distributed over a short period at the commencement. This is immediately mixed with the liquid in the tank and washed out by the dirty liquid as it passes through, the quantity of filter aid carried out to the filter diminishing in accordance with well known mathematical laws, although the rate of passage of the dirty liquid is constant. Instead of adding the liquid to the tank the washer itself may be used as a distributing tank and the filter aid run directly into it. In this case the washing operation may be slightly prolonged.

The concentration of filter aid in the strong suspension or solution must be adapted to the way in which the chamber 6 is used. If this is left half full at the end of the operation, for example, when a skimming pipe is used, instead of completely empty (for example, when outlets as in Figure 3 are used) the solution or suspension must be of double strength in order that the full amount of filter aid for the operation can be run into the space available.

When automatic valves are used for the supply of filter aid suspension, it is desirable to arrange the valve spindles to run in guides which are in free contact with the suspension which should be able to pass freely round them, as if the spindle or any portion connected with it is supported in a substantially closed or partially closed chamber, filter aid may leak in and deposit some of the suspension thus causing a blockage.

The filter pump should take the mixed dirty liquid and filter aid from pipe 1 and pass it to the filter—the agitation in the pump chambers helping to mix the dirty liquor and filter aid.

What we claim is:—

1. A process for cleaning the soiled liquid obtained from the washing machines used in dry cleaning, laundry washing, wool scouring and the like, consisting in treating the soiled liquid with filter aid passing the liquid to a filter and diminishing during at least a portion of the operation the percentage of filter aid in the liquid passing to the filter.

2. A process for cleaning the soiled liquid obtained from washing machines used in dry cleaning, laundry washing, wool scouring and the like, comprising treating the soiled liquid with filter aid, then passing the liquid to a filter, and varying the percentage of filter aid in the liquid passing to the filter as the process proceeds, the filter aid being added to the soiled liquid at a substantially constant rate during the first part of a cleaning operation, and at a rapidly diminishing rate during the balance of the cleaning operation.

3. A process for cleaning the soiled liquid obtained from washing machines used in dry cleaning, laundry washing, wool scouring and the like, comprising adding to the soiled liquid at a constant rate a second liquid carrying filter aid, then passing the liquid to a filter, and diminishing during at least a portion of the operation the proportion of the filter aid in the added solution.

4. A process for cleaning the soiled liquid obtained from washing machines used in dry cleaning, laundry washing, wool scouring and the like comprising agitating a liquid containing filter aid in a chamber, adding the liquid and filter aid at a constant rate to the soiled solution to be cleaned, and at the same time diluting the liquid and filter aid in the chamber by addition into the chamber of liquid containing no filter aid.

5. A process for cleaning the soiled liquid obtained from washing machines used in dry cleaning, laundry washing, wool scouring and the like comprising agitating a liquid containing filter aid in a chamber, adding the liquid and filter aid at a constant rate to the soiled solution to be cleaned, and at the same time diluting the liquid and filter aid in the chamber by addition into the chamber of liquid containing no filter aid, said liquid containing no filter aid being soiled solution coming from the washing machine.

6. A process for cleaning the soiled liquid obtained from washing machines used in dry cleaning, laundry washing, wool scouring and the like, comprising treating the soiled liquid with filter aid, then passing the liquid to a filter, and automatically varying the percentage of filter aid in the liquid passing to the filter as the process proceeds, the filter aid being added to the soiled liquid at a substantially constant rate during the first part of a cleaning operation, and at a rapidly diminishing rate during the balance of the cleaning operation, by diminishing the rate at which the filter aid is added to the soiled liquid throughout a cleaning operation.

7. In apparatus for cleaning the soiled liquid obtained from washing machines used in dry cleaning, laundry washing, wool scouring and the like, a pipe conveying the main flow of soiled liquid, a chamber adapted to contain a supply of liquid carrying filter aid, and a second pipe connecting said chamber and said first-named pipe, and means for making the liquid in said second pipe independent of the suction in said first-named pipe.

8. In a continuous cycle process for cleaning the soiled liquid obtained from washing machines used in dry-cleaning, laundry washing, wool scouring and the like, the steps of withdrawing the soiled liquid from the washing machine, treating the soiled liquid with filter aid, then passing the liquid to a filter, varying the percentage of filter aid in the liquid passing to the filter as the process proceeds, the filter aid being added to the soiled liquid at a substantially constant rate during the first part of the cleaning operation and at a rapidly diminishing rate during the balance of the cleaning operation by diminishing the rate at which the filter aid is added to the soiled liquid throughout the cleaning operation.

In testimony whereof we have signed our names to this specification.

EUSTACE ALEXANDER ALLIOTT.
ARTHUR EDWARD HATFIELD.